Aug. 20, 1929.  E. L. BUXTON  1,724,904
KEYBOARD AND STAFF READER
Filed Oct. 22, 1926
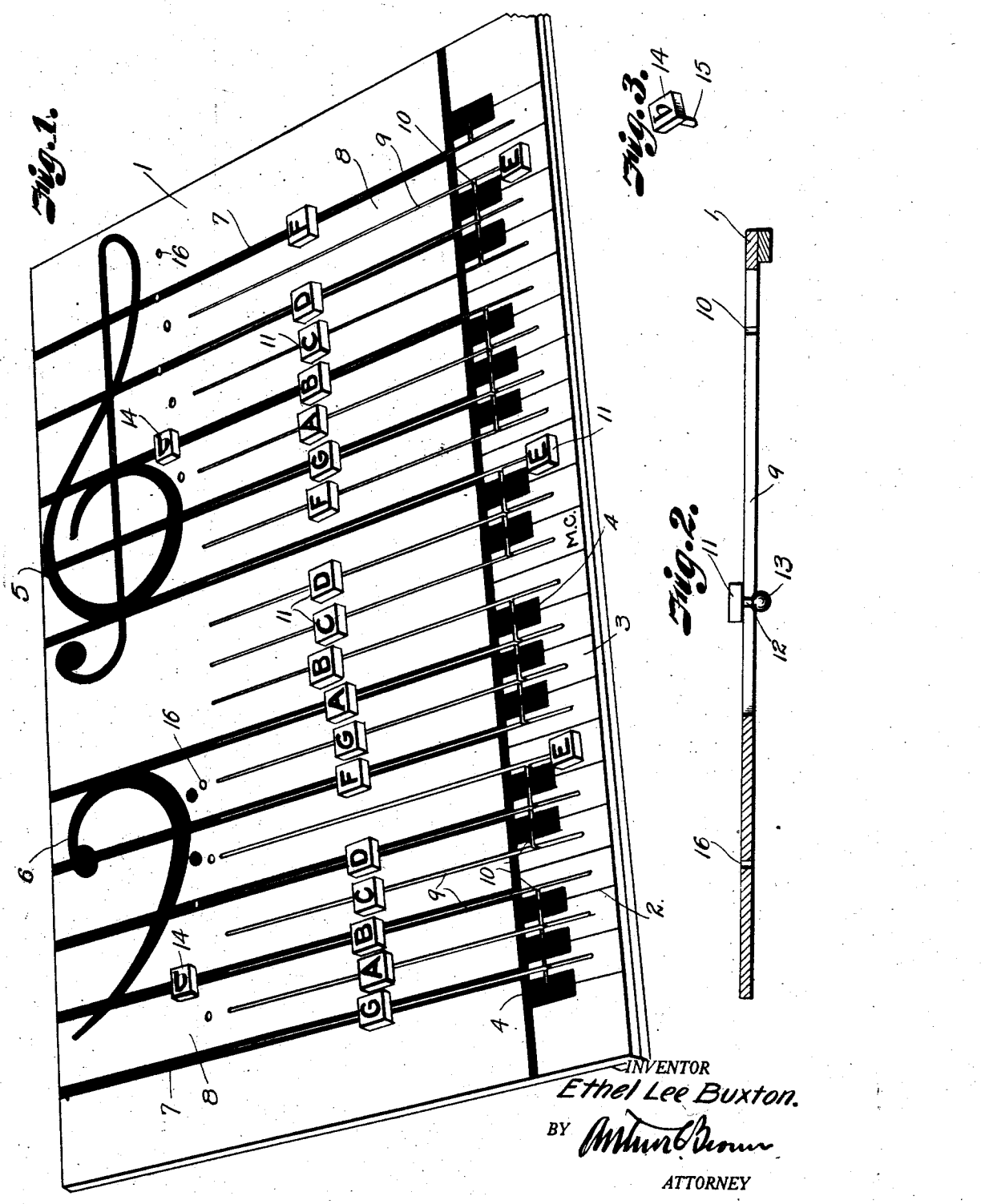
INVENTOR
Ethel Lee Buxton.
BY
ATTORNEY Patented Aug. 20, 1929.

1,724,904

UNITED STATES PATENT OFFICE.

ETHEL LEE BUXTON, OF KANSAS CITY, MISSOURI.

KEYBOARD AND STAFF READER.

Application filed October 22, 1926. Serial No. 143,503.

My invention relates to a keyboard and staff reader for primary piano students and has for its principal object to facilitate instruction by graphic illustration of the relationship between the piano keyboard and the musical staff.

In accomplishing this object I provide a board or the like, bearing the representation of a piano keyboard and of a musical staff, in such relation that markers indicative of the names of the staff lines and spaces may be moved from the staff to the keyboard and back to illustrate the relationship between relative portions of the staff and keyboard.

In the drawings forming part of this application I have illustrated a preferred form of board and its marking.

Fig. 1 is a perspective view of a preferred construction of the board and assembly of the keyboard and staff.

Fig. 2 is a transverse section of the board through one of the marker groups.

Fig. 3 is a detail perspective view of a button employed in connection with the board to indicate a key signature.

Referring more in detail to the drawings: 1 designates the board as a whole and which may be composed of any suitable material, stiff enough to retain its shape under repeated handling and to carry the transverse slots hereinafter mentioned. Extending along one of the longitudinal edges of the board is the representation of a piano keyboard, the transverse lines 2 dividing this portion into spaces representative of white keys 3 and the rear of said portion being marked in solid color to represent the black keys 4.

Back of the keyboard portion the board is lined to indicate the musical staff, the right hand end of the board bearing the treble clef sign 5 and the lower part the base clef sign 6, the signs being arranged parallel with the keyboard so that when the student is working on the keyboard, he holds the board lengthwise in front of him, but when he is working with the staff he turns the board upright or at right angles to its former position.

The staff portion of the board is marked with the staff lines 7 dividing that portion into staff spaces 8.

Extending through the staff lines and spaces into the corresponding white keys in the keyboard are slots 9 having branches 10 leading transversely into the black keys and by means of which sharps and flats may be indicated, as presently described.

Slidably mounted on the board at each key line and space are buttons 11, bearing key names corresponding to their particular locations, the buttons being slidably anchored by shanks 12 which move snugly in the slots 9 and have bosses 13 at their under ends for retaining the buttons to the board. There is a button for each of the staff lines and spaces, each of the buttons bearing the corresponding indicia of the key names.

I also preferably provide the board with buttons 14 having pins 15 for fitting in sockets 16 at the left of the staff, the buttons being marked to indicate sharps or flats and thereby designate the key signature.

In Fig. 1 I have shown a button 14 on the B staff line for both the treble and base clefs, as the signatures in both must be the same, but it is apparent that a button bearing the indication for a sharp may be substituted when the other signature is desired and that the buttons may be shifted to any of the line or space sockets, as the particular occasion may demand.

Assuming the board to be constructed and assembled as described, with a key button slidably mounted in each of the key slots, the operation is as follows:

In teaching it is first desirable that the student learn the names of the keys on the keyboard. This is accomplished with my invention by first moving all of the buttons onto the staff portion of the board and drilling the student merely in the names of the keys, such as A, B, C, D, E, F and G. After the student has learned these key names, then he is taught to associate the names within the corresponding keys in the keyboard. This can be done by requiring him to move one of the name buttons from the staff to the keyboard. As an illustration, he is required to find the location of the keys named "E". To do this he first locates the key buttons and then slides them along the board from the staff onto the keyboard; this being done with all the "E" buttons in the set. When the key buttons have been moved onto the keyboard, the student observes that all of them are located on the white keys to the right of groups of two black keys and thereafter he remembers that each key to the right of a group of two black keys is an "E" key.

He may next be required to locate the "C" keys. Movement of the "C" buttons onto the keyboard shows him that the "C" keys are to the left of a group of two black keys. Likewise the "D" buttons when moved from the staff to the keyboard show him that the "D" keys are the white keys between the members of the groups of two black keys.

Drilling of the student in this manner may be continued until he is thoroughly familiar with the location of the various keys.

After the student has familiarized himself with the keyboard in this manner, he is then taught the letter names of the staff lines and spaces. In teaching the latter the buttons are all moved onto the keyboard. Manipulation of the device while learning the keyboard has taught the student that there are three "C" keys and he is instructed that the middle C (indicated on the board by "M C") is the dividing line between the treble and base clefs. Movement of the middle C key button from the keyboard to the staff shows him the dividing line between the treble and base staffs and movement of the other "C" key buttons shows him that the "C" key button to the right of middle C, when moved to the staff, is located in the third treble space and indicates the letter name for that space. He also learns that the "C" key button to the left of middle C when moved to the staff is located in the second space of the base staff. This further impresses upon the student that the staff above the middle C line is treble and that below the middle C line is base and that the part of the keyboard to the right of middle C is treble and that to the left of middle C is base.

As a continuation of the foregoing process of instruction, the buttons 14 may be employed to indicate to the student that notes indicated by position of that key button are to be sharped or flatted. For illustration, if flat buttons are located on a B degree, then the student knows that all of the B notes are to be flatted and the B buttons thereafter employed in the lesson are to be moved into the branches 10 of the slots and over the black keys instead of to the ends of the slots over the white keys.

Should the sharp buttons 14 be employed, then the notes are to be sharped, and thus indicated by moving the buttons over the first keys to the right of the line or space on which the button for the key to be sharped is located.

In the above statement of operation I have not attempted to go into full detail as to instruction with the board as any skillful music teacher will be able to employ it in a practical way, and while I have referred to the board merely as a keyboard and staff reader for instruction in key names, the device is also useful in teaching scale construction and chord building and reading.

It is further apparent that the indicia carried by the buttons need not be those specifically illustrated, as representations of the notes themselves may be substituted for the letters, and that other changes and variations may be employed without departing from the spirit of the invention.

What I claim and desire to secure by Letters Patent is:—

1. A keyboard and staff reader comprising a board or the like bearing representations of a piano keyboard and a musical staff, the lines and spaces of the staff having fixed relation with corresponding keys of the keyboard, and staff line and space name markers movable to and from corresponding portions of the representations of the staff and keyboard.

2. A keyboard and staff reader comprising a board or the like bearing representations of a piano keyboard and a musical staff, with the staff lines and spaces terminating in corresponding keys of the keyboard, and markers anchored to the board and selectively movable along the staff lines and spaces into and from corresponding keys.

3. A keyboard and staff reader comprising a board or the like bearing representations of a piano keyboard and a musical staff, the board having guides running from lines and spaces of the staff into corresponding keys of the keyboard, and markers selectively movable along the guides.

In testimony whereof I affix my signature.

ETHEL LEE BUXTON.